United States Patent
Gresh et al.

(10) Patent No.: US 7,726,883 B2
(45) Date of Patent: Jun. 1, 2010

(54) FOUR-BEARING ROTOR SYSTEM

(75) Inventors: M. Theodore Gresh, Jeannette, PA (US); James Shurina, Lower Burrell, PA (US); Francis Kushner, Delmont, PA (US)

(73) Assignee: Elliott Company, Jeannette, PA (US)

( * ) Notice: Subject to any disclaimer, the term of this patent is extended or adjusted under 35 U.S.C. 154(b) by 693 days.

(21) Appl. No.: 11/630,525

(22) PCT Filed: Jun. 30, 2005

(86) PCT No.: PCT/US2005/023477

§ 371 (c)(1),
(2), (4) Date: May 8, 2007

(87) PCT Pub. No.: WO2006/007549

PCT Pub. Date: Jan. 19, 2006

(65) Prior Publication Data

US 2007/0292262 A1    Dec. 20, 2007

Related U.S. Application Data

(60) Provisional application No. 60/584,912, filed on Jul. 1, 2004.

(51) Int. Cl.
*F16C 23/02* (2006.01)
(52) U.S. Cl. .................. 384/252; 384/114
(58) Field of Classification Search .......... 384/100, 384/114, 247, 252, 256, 102, 490, 504
See application file for complete search history.

(56) References Cited

U.S. PATENT DOCUMENTS

| | | | |
|---|---|---|---|
| 1,677,496 A * | 7/1928 | Sessions | 384/253 |
| 3,132,906 A * | 5/1964 | Sternlicht | 384/114 |
| 3,388,854 A | 6/1968 | Olofsson et al. | |
| 3,740,164 A | 6/1973 | Zerlauth | |
| 3,900,232 A | 8/1975 | Rode | |
| 4,119,375 A * | 10/1978 | Kirk et al. | 384/104 |
| 4,141,604 A | 2/1979 | Habermann et al. | |
| 4,557,679 A | 12/1985 | Mori et al. | |
| 4,643,592 A * | 2/1987 | Lewis et al. | 384/100 |
| 4,696,585 A * | 9/1987 | Swearingen | 384/399 |
| 4,905,598 A * | 3/1990 | Thomas et al. | 101/219 |
| 4,995,735 A | 2/1991 | Dansdill | |
| 5,009,583 A | 4/1991 | Carlsson et al. | |
| 5,061,087 A | 10/1991 | Roerig et al. | |
| 5,167,496 A * | 12/1992 | Jacobsson et al. | 418/102 |
| 5,273,413 A | 12/1993 | Wallin | |
| 5,397,183 A * | 3/1995 | Lu et al. | 384/1 |
| 5,540,575 A | 7/1996 | Takano et al. | |
| 5,610,500 A | 3/1997 | Giberson | |
| 5,718,517 A | 2/1998 | Morando | |
| 5,813,768 A | 9/1998 | Lyon | |

(Continued)

FOREIGN PATENT DOCUMENTS

WO    WO 00/25035    5/2000

*Primary Examiner*—Thomas R Hannon
(74) *Attorney, Agent, or Firm*—The Webb Law Firm

(57) ABSTRACT

A bearing apparatus for reducing vibrations in a compressor shaft (17) carrying a rotating compressor (10) is provided. The bearing apparatus comprises a first bearing (14) for supporting the shaft (17) and a second bearing (13) spaced outboard from the first bearing (14) for producing a moment on the shaft and additional damping counter to the direction of vibrations.

5 Claims, 5 Drawing Sheets

U.S. PATENT DOCUMENTS

| | | | |
|---|---|---|---|
| 5,913,608 A | 6/1999 | Blume | |
| 5,998,898 A | 12/1999 | Fukutani et al. | |
| 6,142,672 A * | 11/2000 | Bently et al. | 384/118 |
| 6,302,667 B1 * | 10/2001 | Timuska et al. | 418/201.1 |
| 6,572,354 B2 | 6/2003 | Kammhoff et al. | |
| 7,086,783 B2 * | 8/2006 | Shore et al. | 384/519 |
| 2002/0192096 A1 * | 12/2002 | Segers et al. | 418/98 |

* cited by examiner

FOUR-BEARING ROTOR SYSTEM

BACKGROUND OF THE INVENTION

In order to increase the performance of a compressor or other rotating machine, it is often desirable to increase the length of the shaft supporting the rotating elements of the machine. As the length is increased, the critical rotation frequencies at which vibrations take place are reduced. The vibrations are related to the natural sag between the ends of the shaft supported by bearings at each end. While placing additional bearings near the center of the shaft has been considered, it is a considerable drawback. Access to the bearing is very difficult, if not impossible, without disassembling the entire machine. One proposal is to use magnetic bearings near the midpoint between the ends of the shaft as explained in U.S. Pat. No. 4,141,604. It is an object of the present invention to damp the vibrations of a rotating shaft and to increase the critical frequency without requiring addition of inaccessible bearings.

SUMMARY OF THE INVENTION

Briefly, according to the present invention, there is provided a rotating machine with a journal shaft having a bearing apparatus for reducing vibrations. The bearing apparatus comprises a first bearing for supporting the shaft and a second bearing spaced outboard from the first bearing for producing a moment on the shaft and additional damping counter to the direction of vibrations. The second bearing is adjustable after the first bearing is aligned. The first and second bearings are either hydrostatic or hydrodynamic bearings.

According to one embodiment of the present invention, an outboard bearing apparatus reduces vibrations in a compressor shaft carrying a rotating compressor. The outboard bearing apparatus comprises a pair of first bearings for supporting the shaft on each end of the rotating compressor and a pair of second bearings spaced outboard from the first bearings for producing a moment on the shaft and additional damping counter to the direction of vibrations. The second bearing(s) may be utilized on both ends of the shaft or only on one end of the compressor shaft.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
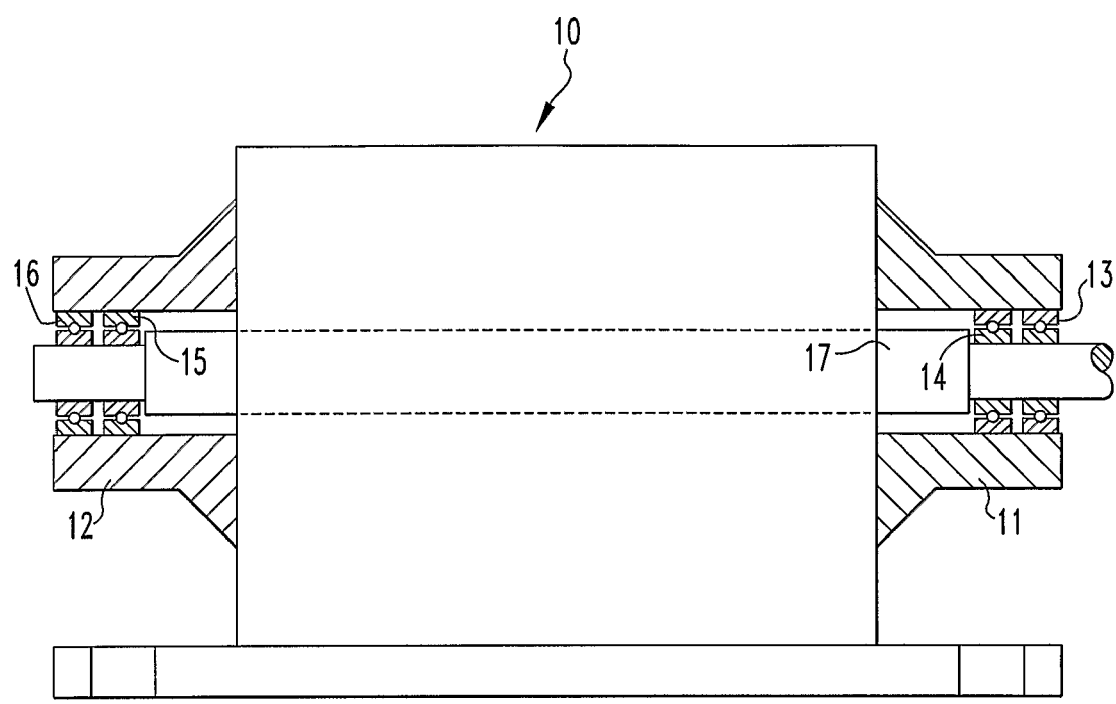
FIG. 1 is a schematic drawing of a rotation machine with the shaft bearings shown in section.
Figure 2A:
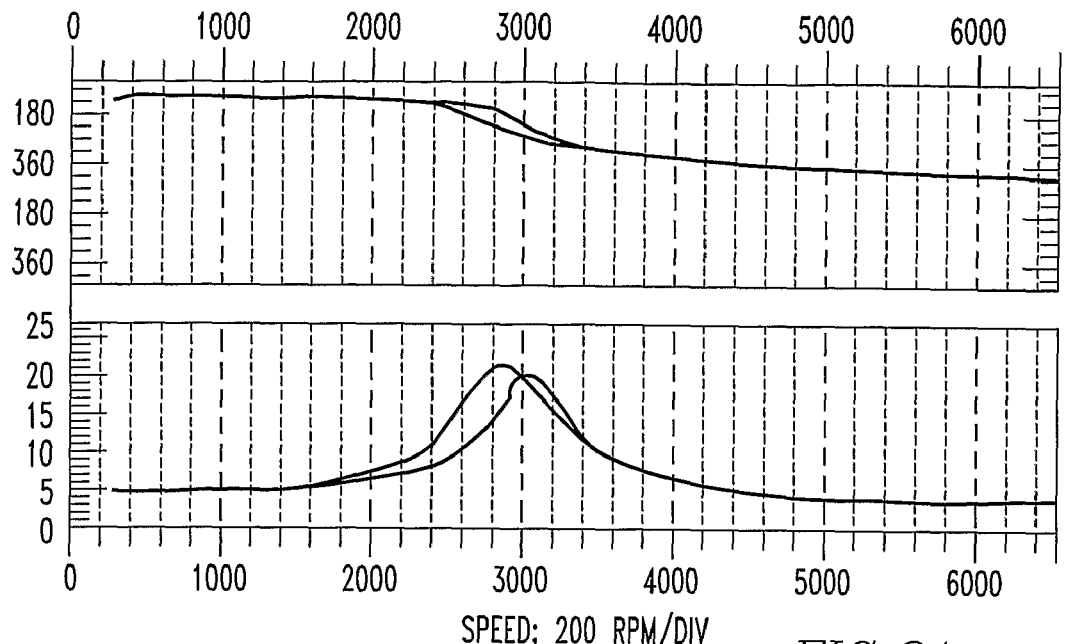
FIGS. 2A to 2D are speed versus vibration charts for a four-bearing system according to the present invention.
Figure 2B:
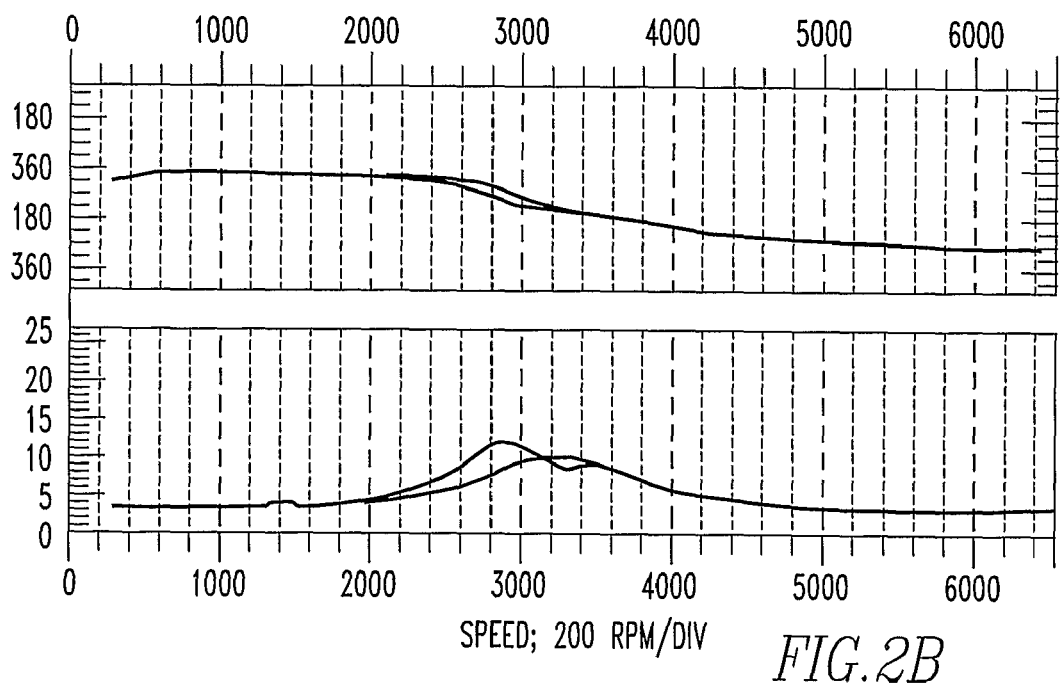
Figure 2C:
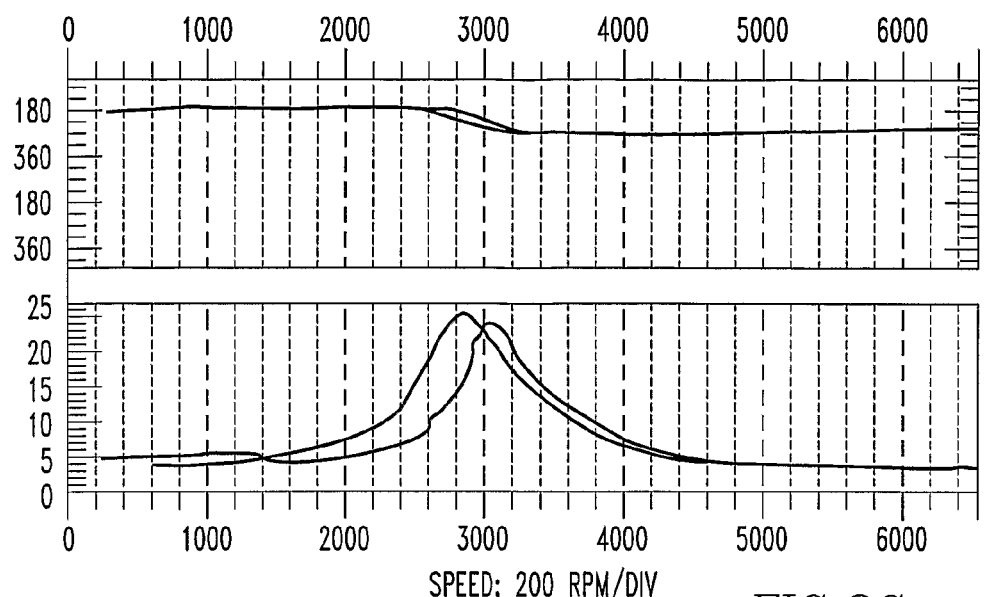
Figure 2D:
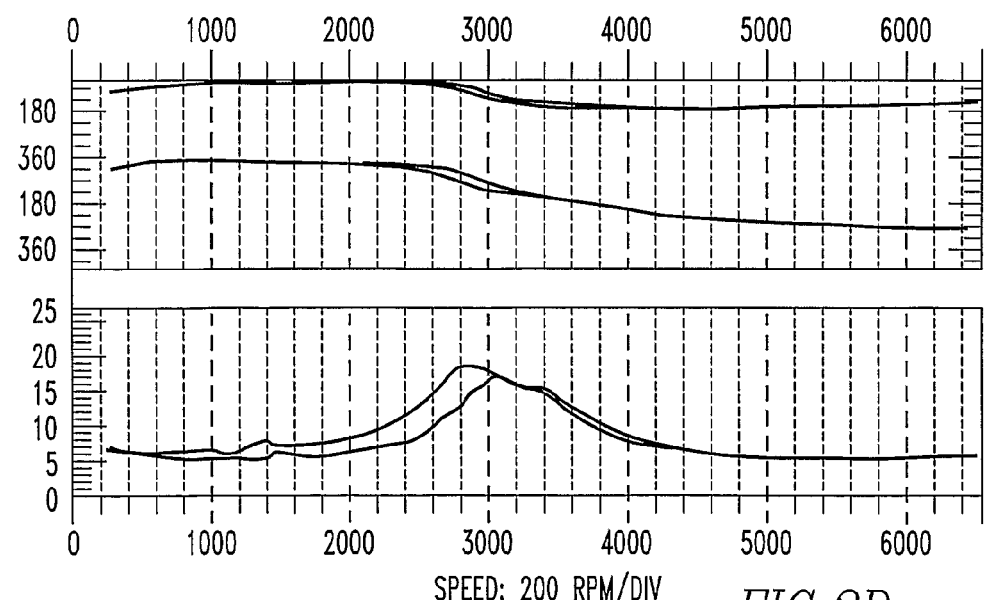
Figure 3A:
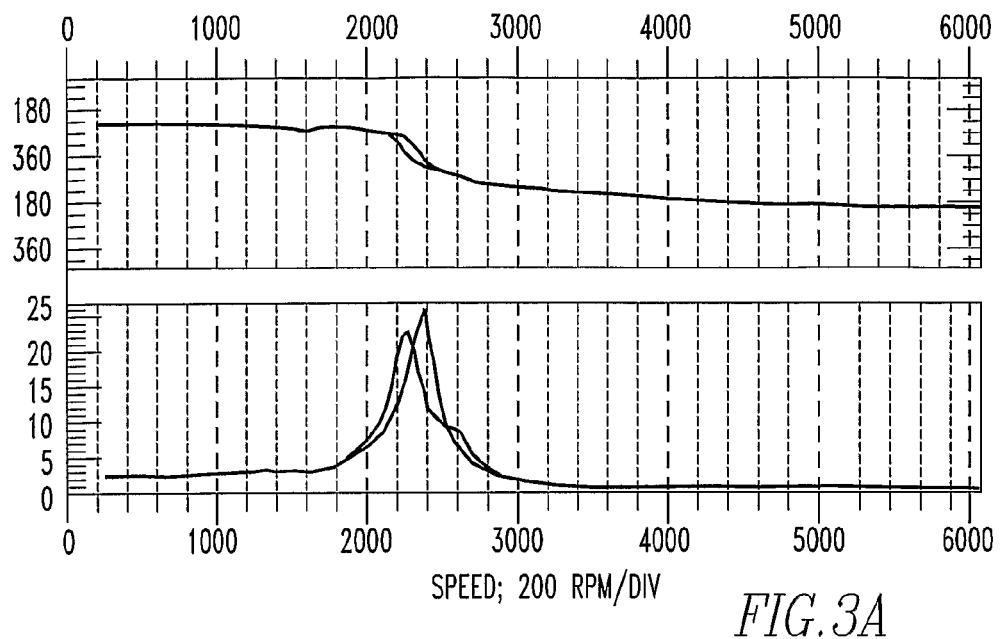
FIGS. 3A to 3D are comparative speed versus vibration charts for a two-bearing system.
Figure 3B:
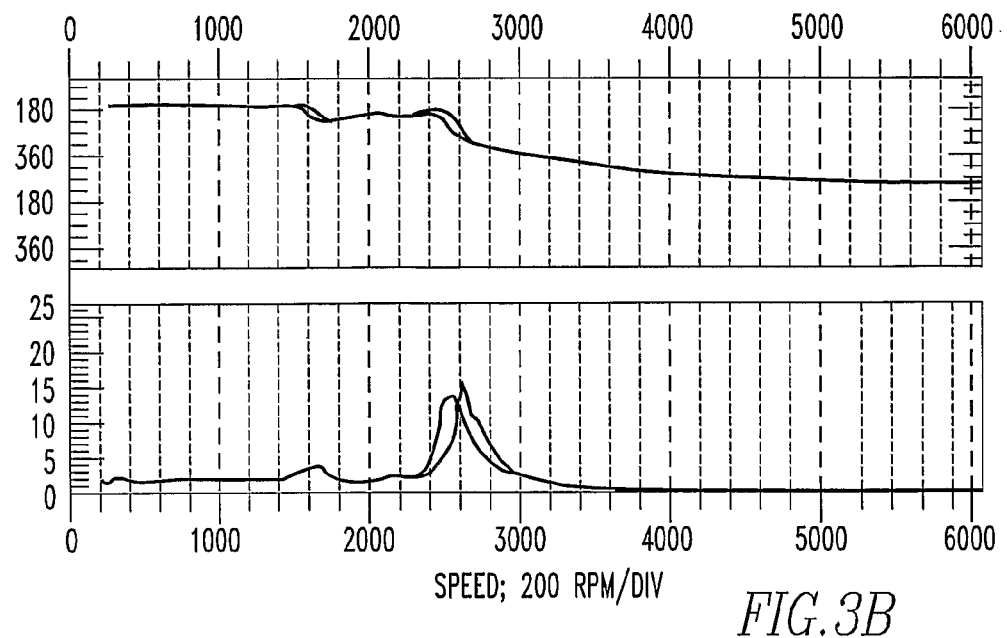
Figure 3C:
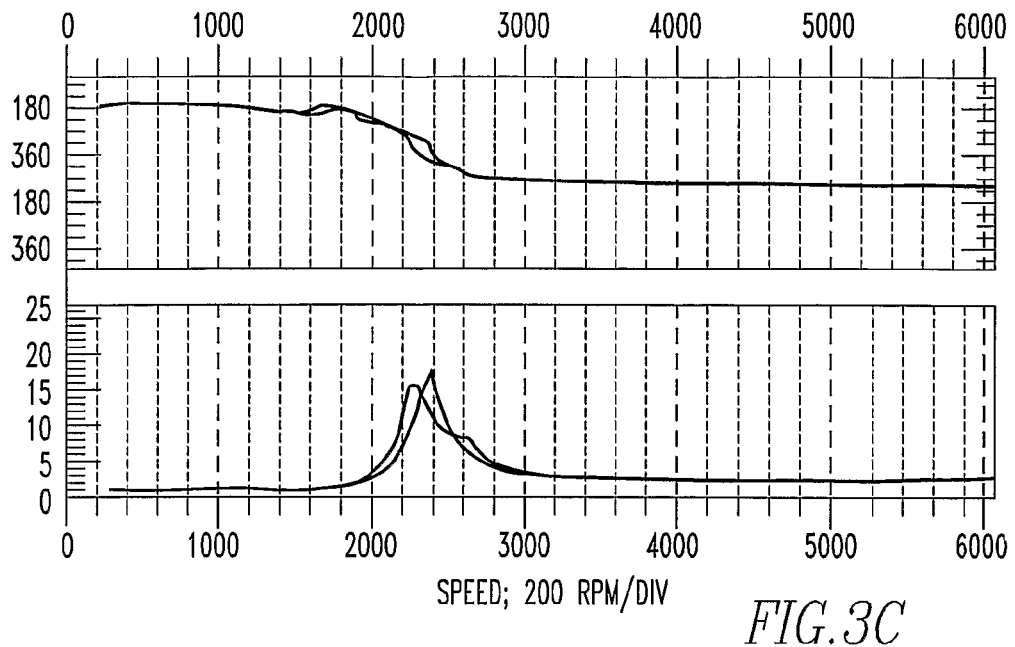
Figure 3D:
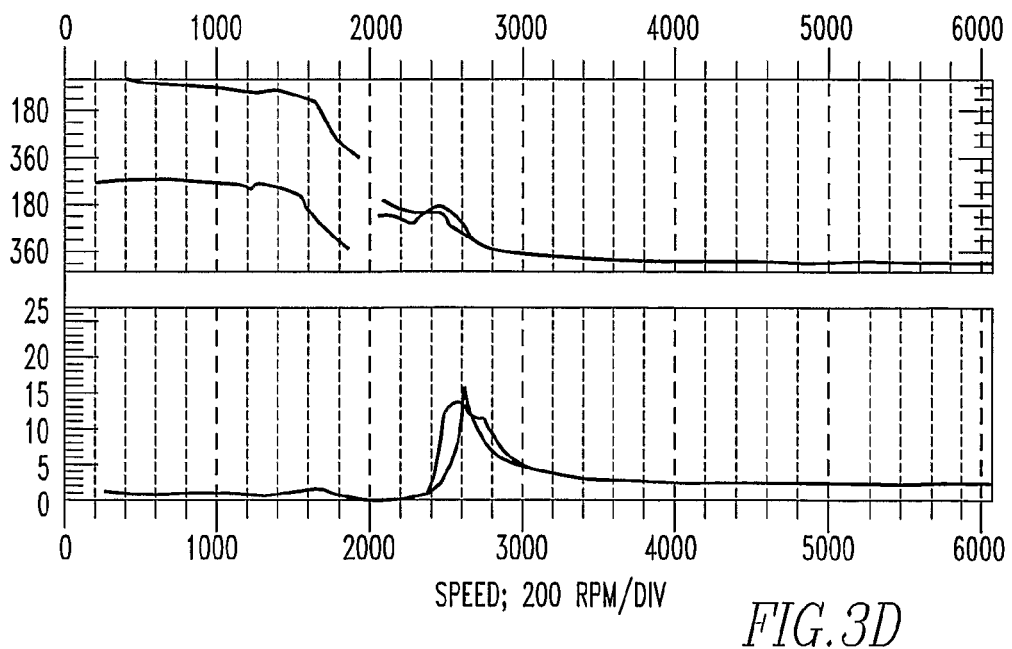

FIG. 1 is a schematic representation of a compressor with the bearings at each end of the shaft shown in section. The compressor body 10 has bearing supports 11, 12 at each end. The bearing supports each hold a pair of spaced bearings 13, 14, 15, 16. The bearings support shaft 17. As shown in the drawing, bearings 13 and 14 support the driven end of the shaft. The shaft has a natural static deflection (sag), and when the shaft is rotated, the deflection results in whirl and self-excited vibrations. Due to the deflection of the shaft, the inner bearings 14 and 15 carry the full static load. The outer bearings 13 and 16 come into play only after some speed of rotation and hydraulic forces (net downward) are developed. Outer bearing clearances are set after the shaft is aligned and clearances set for the inner bearings. The outer bearings damp vibrations and raise the speed at which the first critical frequency takes place.

A four-bearing system has been tested and compared to the same system with the outer bearings removed. In each case, the bearing span between the inner and outer bearings was duplicated and the shaft diameter was constant. Noncontacting probes were used to detect movement of the shaft in the vertical and horizontal directions. The probes were mounted inboard of the bearings. The distance between the inner bearings was approximately 19.5 inches. The distance between inner and outer bearings at each end was about 6 inches. The vibration versus speed data for each probe position and each condition (two bearings versus four bearings) are set forth in FIGS. 2A to 2D and FIGS. 3A to 3D. The data is also summarized in the following table.

TABLE

|  | four-bearing system | two-bearing system | Percent improvement |
| --- | --- | --- | --- |
| H probe Coupling end | 2860 rpm | 2250 rpm | 27.1% |
| V probe Coupling end | 2800 rpm | 2540 rpm | 10.2% |
| H probe Free end | 2840 rpm | 2270 rpm | 25.1% |
| V probe Free end | 2860 rpm | 2560 rpm | 11.7% |

The four-bearing system is an alternative damper bearing system for a long rotor shaft with improvement up to 27% in critical speed/rotor stiffness. Review of the vibration plots (FIGS. 2A to 2D and FIGS. 3A to 3D) shows the broader response through critical speed for the four-bearing system verses the shaper response for the two-bearing system.

Having thus defined our invention in the detail and particularity required by the patent laws what is desired protected by Letters Patent is set forth in the following claims.

The invention claimed is:

1. A bearing apparatus for reducing vibrations in a compressor comprising:
    a shaft having a natural static deflection and, said apparatus comprising a first bearing supporting a full static load of the shaft; and
    a second bearing spaced outboard from the first bearing and operable on the shaft only after rotation thereof develops hydraulic forces, wherein operation of the second bearing produces a moment on the shaft and additional damping counter to the direction of vibrations.

2. The apparatus according to claim 1, wherein the second bearing is adjustable after the first bearing is set on the shaft.

3. A bearing apparatus for reducing vibrations in a compressor comprising:
    a shaft having a natural static deflection, said apparatus comprising a pair of first bearings supporting a full static load of the shaft and respectively located on each end of the shaft; and
    a pair of second bearings spaced outboard on the shaft from the first bearings, respectively, and operable on the shaft only after rotation thereof develops hydraulic forces, wherein operation of the second bearings produces a moment on the shaft and additional damping counter to the direction of vibrations.

4. The apparatus according to claim 3, wherein the second bearings are adjustable after the first bearings are set on the shaft and clearance set for the first bearings.

5. A method for reducing vibrations in a rotating shaft, the shaft having a natural static deflection, comprising the steps of:

supporting a full static load of the shaft with a first pair of bearings provided at opposing ends of the shaft, respectively;

providing a second pair of bearings spaced respectively outboard on the shaft from the first pair of bearings;

placing the shaft to rotation to develop hydraulic forces whereby the second pair of bearings becomes operable on the shaft; and wherein operation of the second pair of bearings produces a moment on the shaft and additional damping counter to the direction of vibrations.

* * * * *